United States Patent [19]
Boivin et al.

[11] Patent Number: 6,141,127
[45] Date of Patent: Oct. 31, 2000

[54] HIGH CAPACITY CHIRPED-PULSE WAVELENGTH-DIVISION MULTIPLEXED COMMUNICATION METHOD AND APPARATUS

[75] Inventors: Luc Boivin, Eatontown; Wayne Harvey Knox, Holmdel; Martin C. Nuss, Fair Haven; Jason Blain Stark, Holmdel, all of N.J.

[73] Assignee: Lucent Technologies Inc., Murray Hill, N.J.

[21] Appl. No.: 09/027,055

[22] Filed: Feb. 20, 1998

[51] Int. Cl.[7] .................................................. H04J 14/02
[52] U.S. Cl. ..................... 359/124; 359/133; 359/134; 359/140; 359/161; 359/122; 250/227.12
[58] Field of Search .................................. 359/124, 122, 359/127, 156, 133–134, 140, 161; 250/227, 12

[56] References Cited

U.S. PATENT DOCUMENTS

| | | | |
|---|---|---|---|
| 5,631,758 | 5/1997 | Knox et al. | 359/127 |
| 5,703,708 | 12/1997 | Das et al. | 359/140 |

OTHER PUBLICATIONS

206–channel Chirped–Pulse Wavelength–Division Multiplexed Transmitter; L. Boivin, M. C. Nuss, W. H. Knox and J. B. Stark; Electronics Letters, vol. 33, No. 10, pp. 827–228, Apr. 8, 1997.

*Primary Examiner*—Kinfe-Michael Negash
*Attorney, Agent, or Firm*—J. J. Brosemer

[57] ABSTRACT

A high-capacity, chirped-pulse wavelength-division multiplexed communications apparatus and method in which a chirped-pulse, wavelength-division multiplexed signal is further optically multiplexed thereby enhancing bit rates per channel. A multifrequency optical source for supplying an optical signal having a number of wavelength division multiplexed (WDM) channels; a power splitter for splitting the optical signal from the multifrequency source into a number of signals; a number of time delay lines, for delaying each one of the signals independently; a number of data encoding modulators for modulating each one of the delayed signals; and a power combiner for combining the number of delayed, modulated signals into a single signal such that the multifrequency optical source signal is multiplexed by a desired amount.

24 Claims, 5 Drawing Sheets

PRIOR ART – SCHEMATIC DIAGRAM OF 206-CHANNEL CHIRPED-PULSE WDM TRANSMITTER

HIGH CAPACITY CHIRPED-PULSE WAVELENGTH-DIVISION MULTIPLEXED COMMUNICATION METHOD AND APPARATUS

TECHNICAL FIELD

This invention relates generally to the field of optical communications systems and in particular to a high-capacity, chirped-pulse multiple wavelength communications method and apparatus.

BACKGROUND OF THE INVENTION

Optical communications devices and methods employing same are a substantial and fast-growing constituent of communications networks. Applications of such methods and devices include, but are not limited to, telecommunications systems, cable television, and local area networks (LANs).

As the demand for such applications increases however, the current capacity of existing waveguiding media is limited. And while the capacity of the media may be expanded, e.g., by deploying more fiber optic cables, the cost of such expansion is prohibitive. Consequently, there has been a great demand for cost-effective methods and apparatus that increase the capacity of existing optical waveguides.

Wavelength division multiplexing (WDM) has been shown as a promising approach for increasing the capacity of existing fiber optic networks. A communications system employing WDM uses plural optical signal channels, each channel being assigned a particular channel wavelength. In such a WDM system, optical signal channels are generated, multiplexed to form an optical signal comprised of the individual optical signal channels, transmitted over a single waveguide, and demultiplexed such that each channel wavelength is individually routed to a designated receiver. Through the use of optical amplifiers, such as doped fiber amplifiers, plural channels are directly amplified simultaneously, facilitating the use of WDM systems in long-distance applications.

U.S. Pat. No. 5,631,758 issued to Knox et al. on May 20, 1997 disclosed a Chirped-Pulse Multiple Wavelength Telecommunications System. This patent, which is assigned to the assignee of the present application, is expressly incorporated herein by reference. As described therein, a chirped-pulse-WDM technique defines and encodes data on a large number of channels using a spectrally broadband source and a single modulator.

With this chirped-pulse WDM technique, laser pulses become chirped as they propagate through a dispersive delay line such as an optical fiber that introduces a time delay between their frequency components. Frequency bands that are useful as WDM channels are then selected from the pulses' continuous spectra through the action of a modulator operating at a multiple of the laser repetition rate, i.e., 36.7 MHz.

Proof of the effectiveness of the WDM technique was described by L. Boivin, M. C. Nuss, W. H. Knox and J. B. Stark in an article entitled "206-Channel Chirped-Pulse Wavelength Division Multiplexed Transmitter" that appeared in Electronics Letters, Vol.33, No. 10, pp. 827–828, $8^{th}$ April, 1997 and incorporated herein by reference. As disclosed in this article and shown in schematic form in FIG. 1, a single femtosecond laser, a single dispersive optical fiber, and a single time-division-multiplexed electroabsorption modulator (EAM) is used to generate the 206 useful channels.

The single laser is used because combining and stabilizing a large number of single frequency lasers is prohibitively complicated and expensive. A mode-locked erbium doped fiber-ring laser is used as the source of sub-picosecond laser pulses with a bandwidth of >70 nm and a repetition rate of 36.7 MHz. The spectrum of each pulse is mapped onto the time axis as it propagates through a single mode fiber that has a total dispersion of −340 psec/nm. This propagation stretches out the pulses to a duration of about 24.2 nsec and provides a nearly linear relationship between wavelength and time delay within each pulse.

A TDM electroabsorption modulator that has a 12-GHz bandwidth is installed at the output of the chirping fiber to define and encode data onto each channel in a time-sequential manner. It uses a TDM multiplexed pattern generator synchronized to the $271^{st}$ harmonic, or 9.942 GHz of the laser repetition rate. The short-wavelength absorption edge of the modulator results in the spectral narrowing of the pulses to about 28 nm. To partially restore the original bandwidth and to equalize the transmitted spectrum, the modulator bias is adjusted dynamically using feed-forward equalization as each pulse passes through.

Additionally, when the frequency components of the short pulse laser are separated temporarily by propagation in a dispersive medium, a single TDM modulator can be used to encode data on all channels. Accordingly, a 271-bit TDM "word" is used for every pulse to encode data onto each of the 271 frequency slots defined by the modulator. When the same word is used for each pulse, a stable optical spectrum is obtained. The chirping fiber converts the TDM pattern into a WDM modulation with states "1" and "0" corresponding to high- and low-intensity frequency bands, respectively. Out of 271 possible wavelength slots defined by the modulator, 206 have been identified with sufficient optical power.

As can be readily appreciated, the larger the number of wavelength channels, the lower the speed at which related electronics have to operate thereby decreasing overall system cost. Also, the chirped-pulse WDM provides hundreds of WDM channels from a single source without the need to stabilize the wavelength of each channel. Consequently, there is a continuing need for an efficient and cost-effective WDM methods and apparatus that permit transmitting a large number of spectral channels.

SUMMARY OF THE INVENTION

An advance is made over the prior and in particular we overcome the capacity limitations of the prior art chirped-pulse WDM systems which is limited in capacity to the modulation speed of the TDM modulator. Accordingly the present invention is directed to a method and apparatus for providing high-capacity, chirped-pulse wavelength-division multiplexed communications in which a chirped-pulse, wavelength-division multiplexed signal is further optically multiplexed.

Viewed from one aspect, the present invention is directed to an apparatus including: a multifrequency optical source for supplying an optical signal having a plurality of wavelength division multiplexed (WDM) channels; a power splitter for splitting the optical signal from the multifrequency source into a number of signals; a number of time delay lines, for delaying each one of the signals independently; a number of data encoding modulators for modulating each one of the delayed signals; and a power combiner for combining the number of delayed, modulated signals into a single signal such that the multifrequency optical source signal is multiplexed by a desired amount.

Viewed from another aspect, the present invention is directed to a method for operating a high-capacity, chirped-pulse wavelength-division multiplexed communications apparatus whereby an optical signal having a plurality of wavelength division multiplexed channels is generated, split, delayed by a desired amount, modulated and then combined into a single signal such that individual WDM channels are in temporally spaced relation to one another.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

Figure 1:
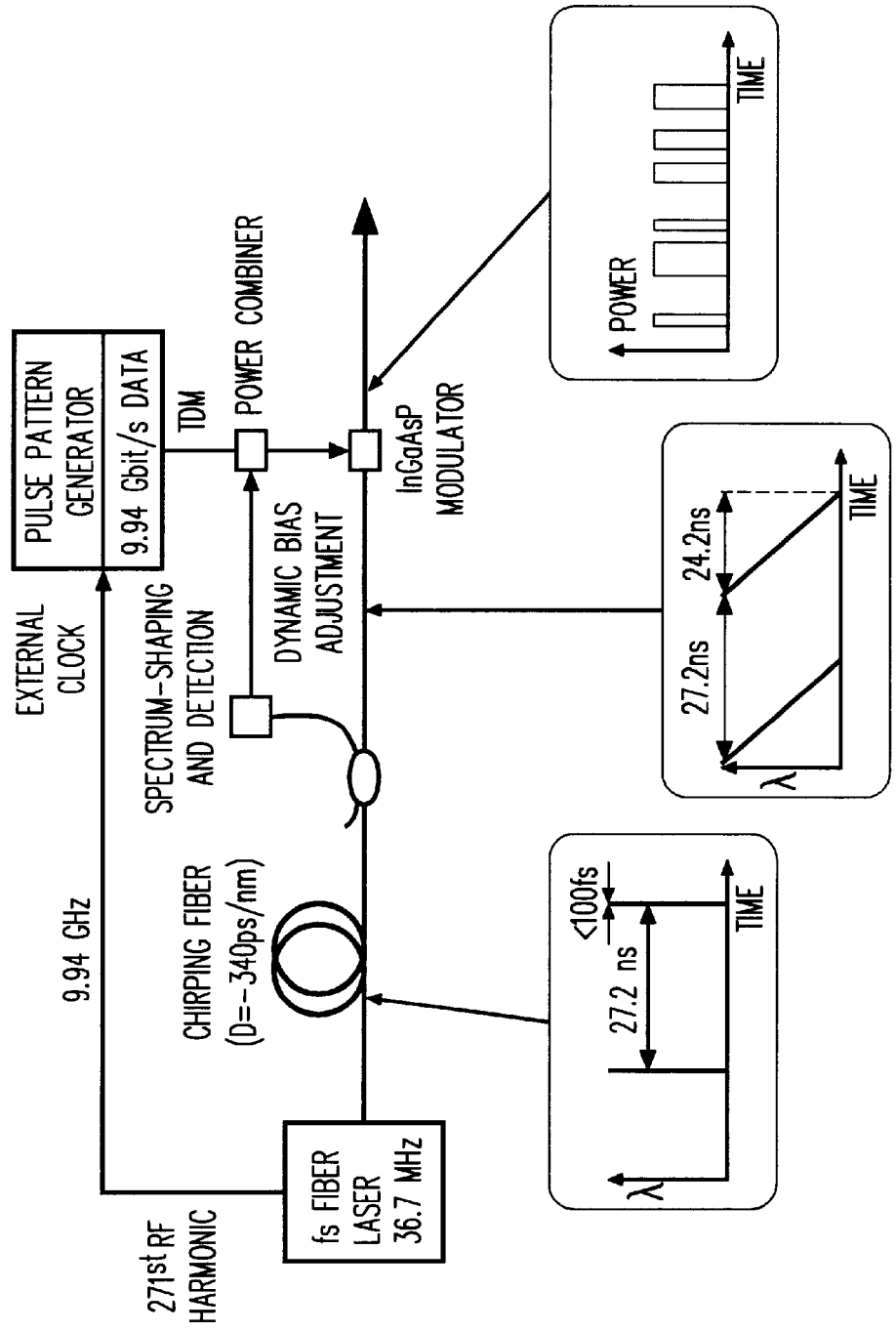
FIG. 1 is a schematic of a prior-art 206 channel optical chirped-pulse wavelength-division multiplexed transmitter.
Figure 2:
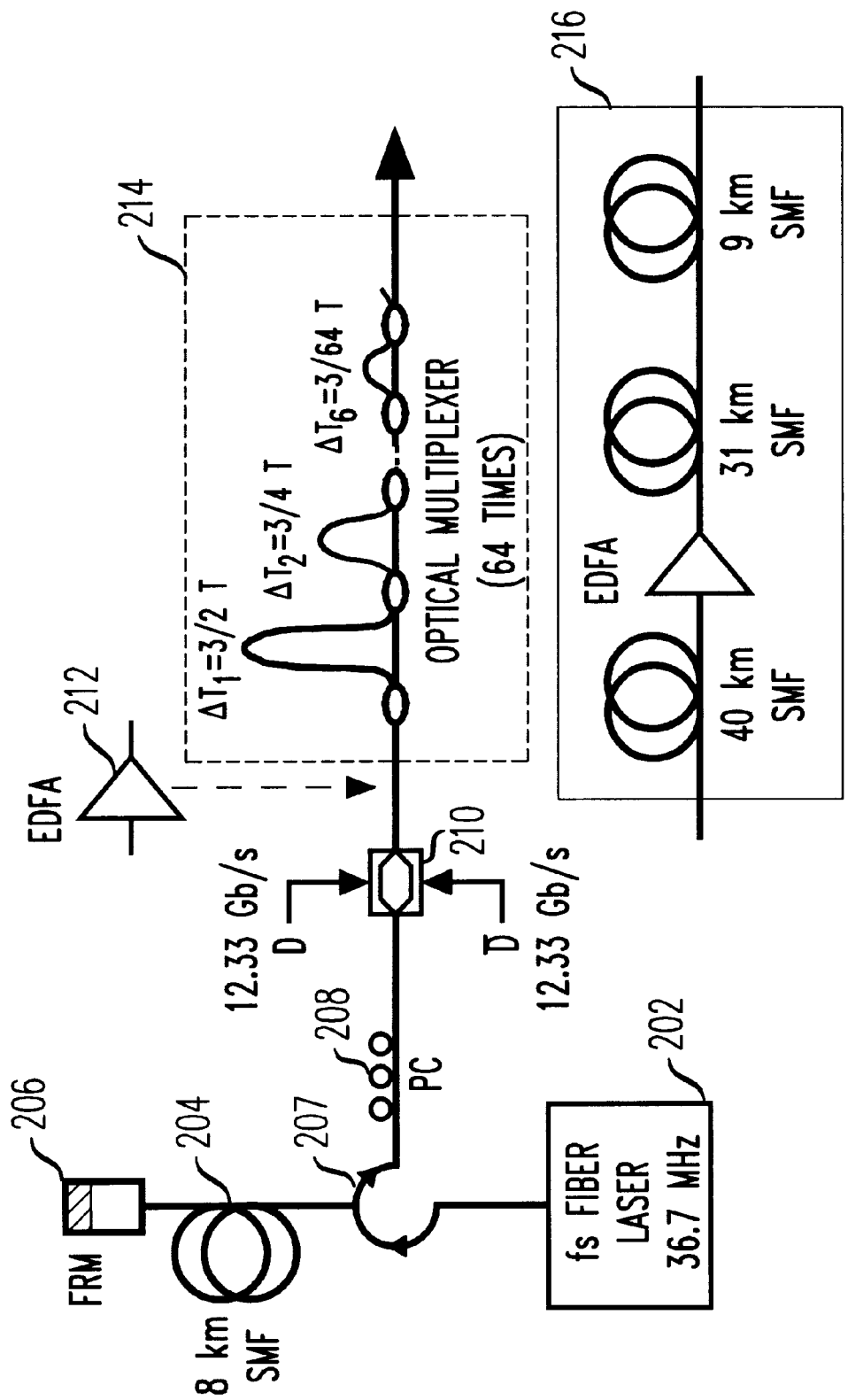
FIG. 2 is a schematic of an experimental optical chirped-pulse wavelength-division multiplexed transmitter in accordance with the present invention used for optical time-interleaving of pseudorandom data.

With reference now to FIG. 2, there it shows a schematic of an exemplary optical chirped-pulse wavelength-division multiplexed transmitter in accordance with the present invention. Specifically, light pulses with a bandwidth in excess of 80 nm are extracted from a modelocked laser 202 having a repetition rate of 36.7 MHz. The spectrum of each pulse is mapped onto the time axis by propagation through 16 km (round trip) of standard, single mode chirping fiber 204 (D≅17 ps/km/nm), causing the pulses to be stretched to a duration of approximately 24 ns. A Faraday rotator mirror 206 inserted substantially halfway along the length of the chirping fiber 204, rotates the polarization of the light by 90 degrees and advantageously eliminates polarization mode dispersion through the chirping fiber.

The chirped pulses propagate through circulator 207, through polarization controller 208 and into modulator 210. The modulator 210 is driven with a TDM pattern synchronized to the $336^{th}$ harmonic ($v_{mod}$=12.328 GHz) of the repetition rate of the fiber laser 202. This action defines the channels, encoding a 36.7 Mb/s pseudo-random bit sequence (PRBS) on each channel.

The data stream is then amplified, by gain-flattened, erbium-doped fiber power amplifier 212 and then input to optical multiplexer 214 used in an experiment for multiplexing pseudorandom data streams. As is depicted in FIG. 2, the bit rate of the data stream is increased 64 times, to 2.35 Gb/s.

Further shown in FIG. 2, an illustrative transmission system comprising 71 km of single mode fiber (SMF), an erbium-doped fiber line amplifier, and 9 km of dispersion compensating fiber (DCF).

Figure 5:
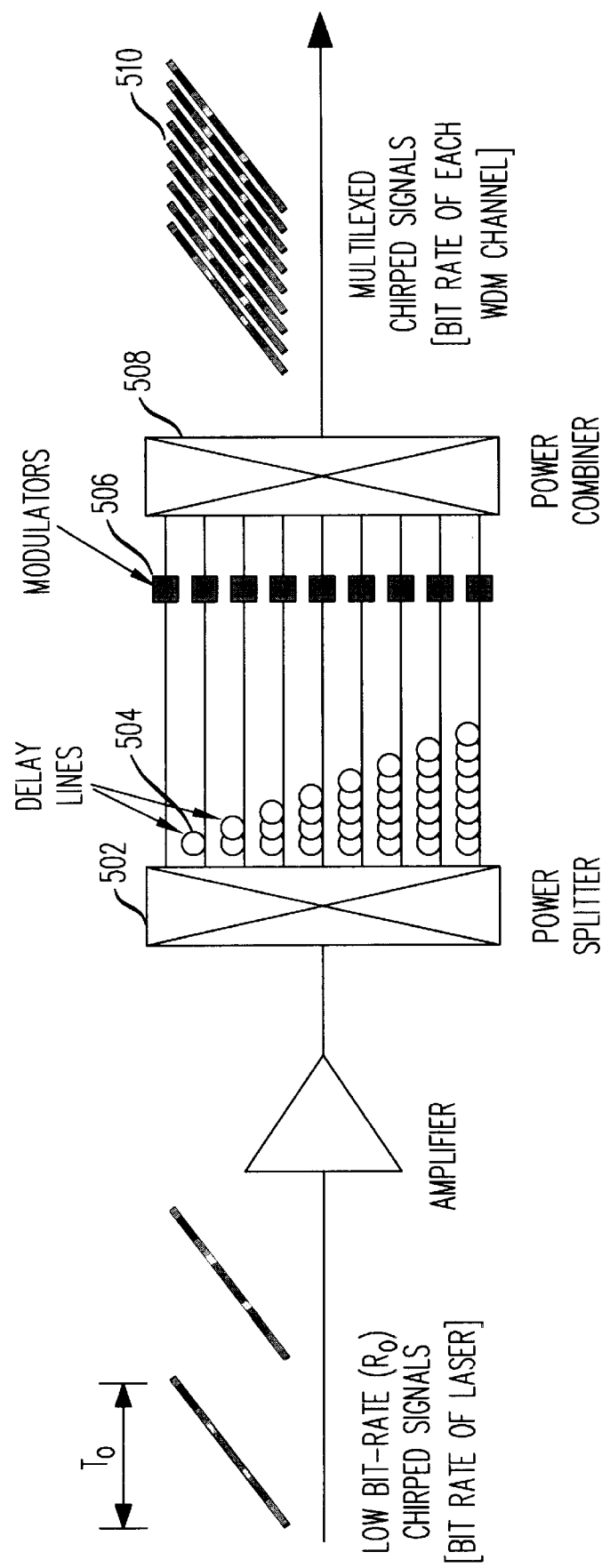
FIG. 5 is a schematic diagram of the optical multiplexer which is the subject of the present invention.

As is readily apparent to those skilled in the art, conventional chirped pulse WDM transmitters are limited to an aggregate bit rate equal to the modulator TDM rate because they are TDM encoded at the source. In the present invention, the chirped pulse WDM data streams are time interleaved thereby achieving significantly higher aggregate bit rates than is possible with prior art methods and apparatus. Accordingly, and with reference now to FIG. 5, incoming chirped-pulse signals 501 are amplified and power split M times by power splitter 502. The split signals are then data encoded in parallel by M modulators 506, after time-interleaving through the use of delay lines 504, and then combined into a single fiber by power combiner 508 as combined, multiplexed chirped signal 510.

Figure 3:
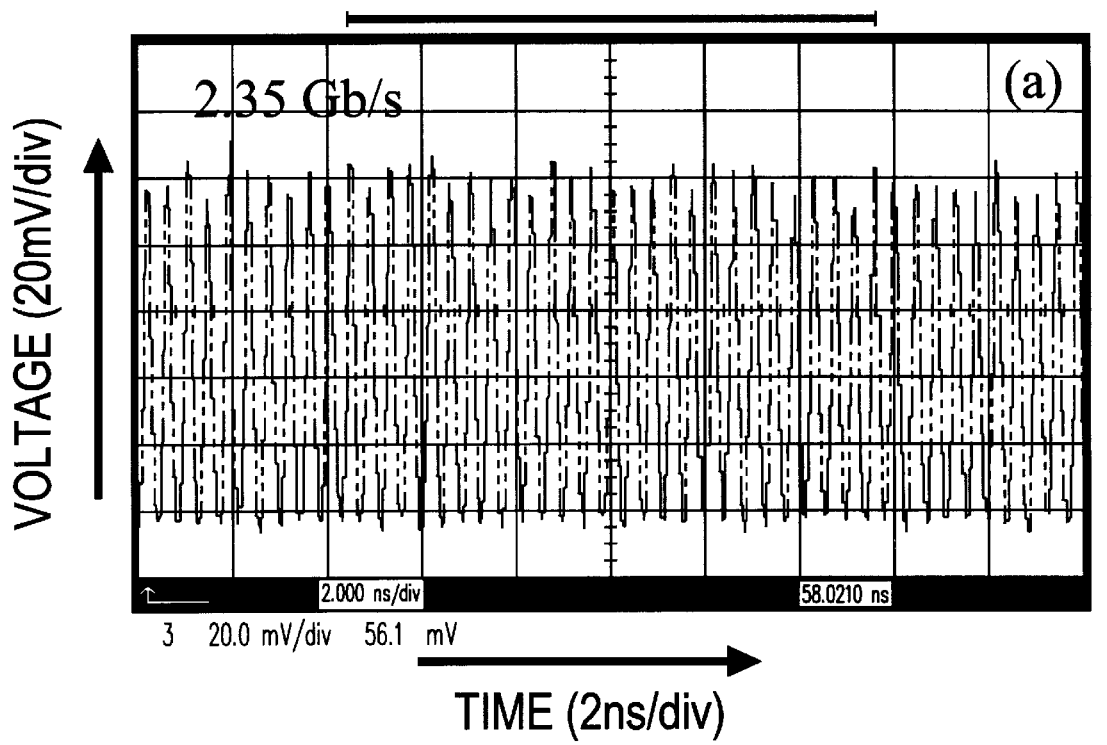
FIG. 3(a) is a diagram showing the output of the multiplexer of FIG. 2 when no data is encoded at the input.
FIG. 3(b) is a diagram showing the output spectrum of the multiplexer when the same 336-bit TDM word "11001100 . . . 1100" is encoded at the input.
Figure 3:
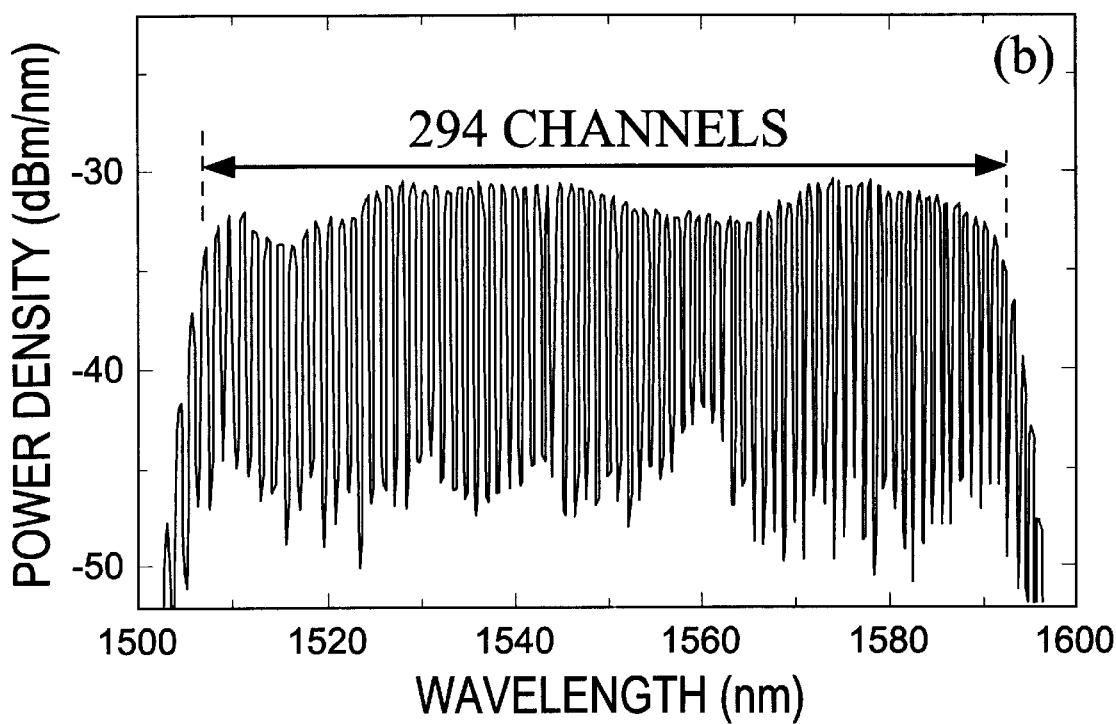

FIG. 3(a) shows the output of the optical multiplexer 214 when no data is encoded at the input. FIG. 3(b) shows the output spectrum of the optical multiplexer 214 when the same 336-bit TDM word "11001100 . . . 1100" is encoded on every pulse. From this figure, 294 wavelength channels can be identified with less than 3 dB channel variation. The total output power integrated over all channels is −15 dBm.

Figure 4:
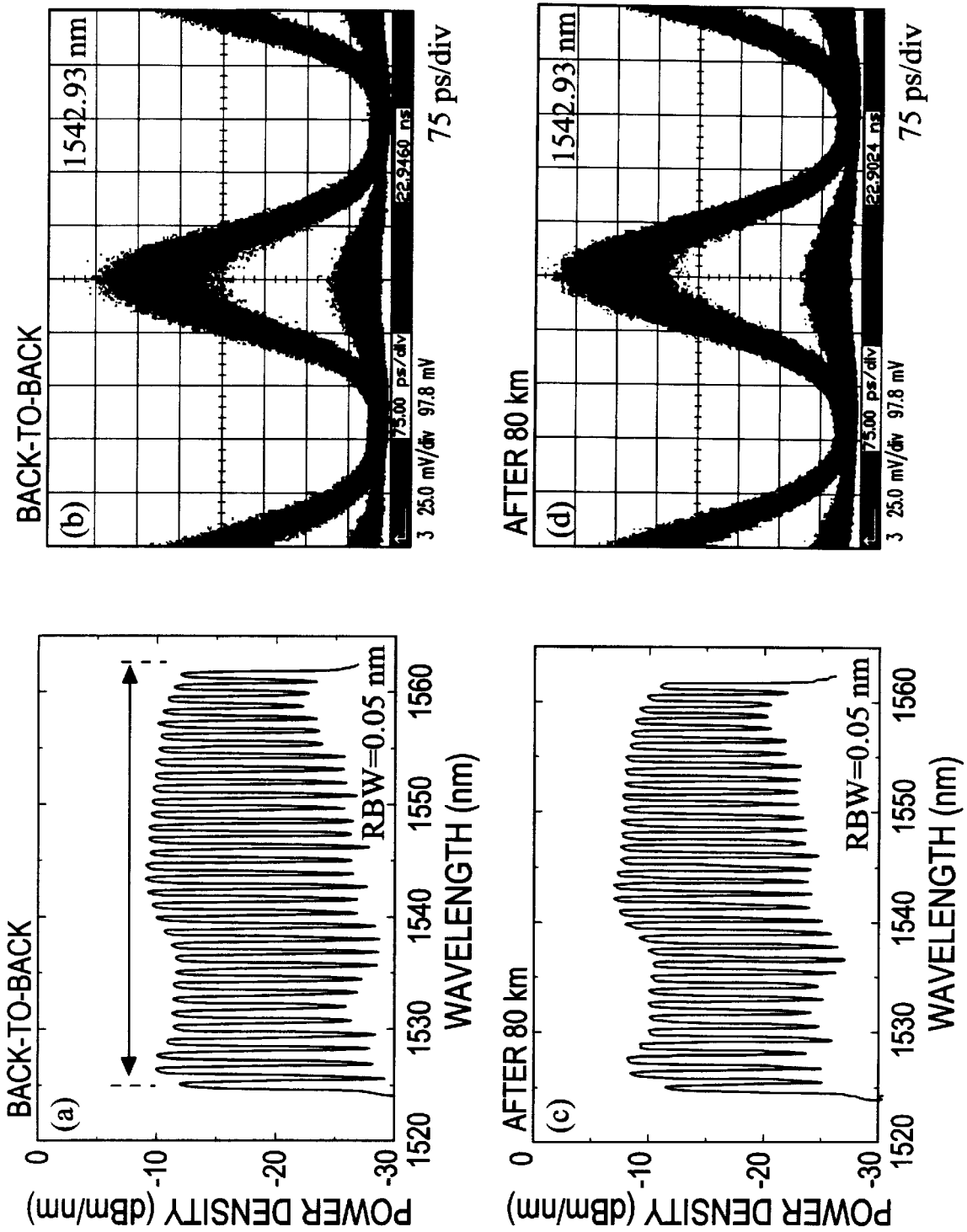
FIG. 4(a) is a diagram showing spectrum narrowing when a broadband gain-flattened erbium-doped fiber amplifier with a 37 nm bandwidth (3 dB) is inserted at the input of the optical multiplexer.
FIG. 4(b) is a diagram showing an "eye diagram" for a channel centered at 1542.93 nm.
FIG. 4(c) is a diagram showing the spectrum narrowing of FIG. 4(a) after propagation through the 71 km transmission line shown as 216 in FIG. 2.
FIG. 4(d) is a diagram showing an "eye diagram" after propagation through the same 71 km transmission line shown as 216 in FIG. 2.

FIG. 4(a) shows how the spectrum narrows to 128 channels when a broadband, gain-flattened erbium-doped fiber amplifier with a 37 nm bandwidth (3 dB) is inserted at the input of the optical multiplexer 214. The total output power over this bandwidth is 2.3 dBm.

FIG. 4(b) shows an eye diagram obtained with a recovered clock at the output of the OTDM stage for the channel centered at 1542.93 nm. FIG. 4(c) and FIG. 4(d) show the same spectrum and eye diagram after propagation through illustrative transmission system 216. As those skilled in the art will quickly recognize, a slight change of the spectrum is seen, but no degradation of the eye is apparent.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The invention claimed is:

1. A high-capacity, chirped pulse wavelength division multiplexed communications apparatus comprising:

a multifrequency optical source for supplying an optical signal having a plurality of wavelength division multiplexed (WDM) channels, substantially all light supplied over a given time interval being within a single wavelength channel;

a power splitter having an input port for receiving the optical signal from said multifrequency source, and a plurality of output ports;

a plurality of time delay lines, each one of said delay lines being coupled to one of said output ports;

a plurality of data encoding modulators, each one of said plurality of data encoding modulators being coupled to one of said delay lines and being operable to sequentially modulate at least some of the wavelength channels present on an output signal received from said power splitter; and a power combiner having a plurality of input ports and an output port, each one of said ports being coupled to one of said data encoding modulators such that optical power input to said power combiner on said plurality of input ports is combined and output said output port.

2. The high-capacity, chirped pulse wavelength division multiplexed communications apparatus according to claim 1 further comprising:

a plurality of amplifiers, each one of said amplifiers being interposed between and coupled to said splitter output ports and the time delay lines.

3. The high-capacity, chirped pulse wavelength division multiplexed communications apparatus according to claim 1 wherein said multifrequency source is a broadband short pulse source with each WDM channel being temporally separated from any other WDM channel by propagation of the broadband short pulse through a dispersive delay line.

4. The high-capacity, chirped pulse wavelength division multiplexed communications apparatus according to claim 3 wherein the dispersive delay line comprises a length of dispersive optical fiber.

5. The high-capacity, chirped pulse wavelength division multiplexed communications apparatus according to claim 1, wherein said multifrequency source includes an array of substantially single frequency lasers, each emitting light constituting a respective wavelength channel and being operable to supply a pulse occupying a fraction of time such that only a single WDM laser in the array emits over a given time interval.

6. The high-capacity, chirped pulse wavelength division multiplexed communications apparatus according to claim 1 further including at least one optical amplifier coupled to a port of said power splitter.

7. The high-capacity, chirped pulse wavelength division multiplexed communications apparatus according to claim 6, wherein said at least one optical amplifier is coupled to an input port of said power splitter.

8. The high-capacity, chirped pulse wavelength division multiplexed communications apparatus according to claim 7 wherein said at least one optical amplifier is an erbium doped fiber amplifier.

9. The high-capacity, chirped pulse wavelength division multiplexed communications apparatus according to claim 1 wherein said optical amplifier is coupled to an output port of said power combiner.

10. An optical transmitter apparatus comprising:

a means for supplying a multifrequency optical signal having a plurality of wavelength division multiplexed (WDM) channels, substantially all light supplied over a given interval being within a single WDM channel;

a means for power splitting having an input port and a plurality of output ports, for receiving the optical signal from said multifrequency supplying means and splitting same;

a means for delaying signals emitted from said output ports;

a means for data encoding modulation, said data encoding modulation means being coupled to said output ports and being operable to sequentially modulate at least some of the WDM channels present on an output signal received from said power splitting means; and a means for combining the modulated signals into a single, combined signal.

11. The optical transmitter according to claim 10, further comprising:

a means for amplification interposed between the output ports of said splitting means and said delay means.

12. The optical transmitter according to claim 10, wherein said multifrequency supplying means further comprises:

a means for eliminating polarization mode dispersion.

13. The optical transmitter according to claim 11, wherein said multifrequency supplying means is a broadband short pulse source with each WDM channel being temporally separated from any other WDM channel by propagation of the broadband short pulse through a means for dispersive delay.

14. The optical transmitter according to claim 13 wherein the dispersive delay means comprises a length of dispersive optical fiber.

15. The optical transmitter according to claim 14 wherein the dispersive delay means further comprises:

a means for eliminating polarization mode dispersion in the optical fiber.

16. The optical transmitter according to claim 14 wherein said multifrequency supplying means includes an array of substantially single frequency lasers, each emitting light constituting a respective wavelength channel and being operable to supply a pulse occupying a fraction of time such that only a single WDM laser in the array emits over a given time interval.

17. The optical transmitter according to claim 16, further comprising an amplification means coupled to an input port of said power splitter.

18. The optical transmitter according to claim 16, wherein said amplification means is an erbium doped fiber amplifier.

19. The optical transmitter according to claim 16, further comprising an amplification means coupled to an output port of said power combiner.

20. A method of operating a high-capacity, chirped-pulse wavelength-division multiplexed communications apparatus comprising the steps of:

generating, an optical signal having a plurality of chirped-pulse wavelength division multiplexed channels;

splitting said optical signal into a plurality of signals;

delaying, each one of said plurality of signals by a different amount of time;

modulating each one of said delayed signals; and combining the modulated signals into a single signal such that individual WDM channels are in temporally spaced relation.

21. The method of operating a high-capacity, chirped-pulse wavelength-division multiplexed communications apparatus according to claim 20 further comprising the step of:

amplifying, the split plurality of signals prior to delay.

22. The method of operating a high-capacity, chirped-pulse wavelength-division multiplexed communications apparatus according to claim 21 further comprising the step of:

amplifying, the generated signal prior to splitting.

23. The method of operating a high-capacity, chirped-pulse wavelength-division multiplexed communications apparatus according to claim 21 further comprising the step of:

rotating the polarization of the generated signal prior to splitting such that polarization mode dispersion of the signal is substantially eliminated.

24. The method of operating a high-capacity, chirped-pulse wavelength-division multiplexed communications apparatus according to claim 20 further comprising the step of:

launching the combined signals into an optical medium.

* * * * *